(12) United States Patent
McLellan

(10) Patent No.: US 6,973,153 B1
(45) Date of Patent: Dec. 6, 2005

(54) TRANSMIT AND RECEIVE PROTECTION CIRCUIT

(75) Inventor: Scott W. McLellan, Kempton, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/516,820

(22) Filed: Mar. 1, 2000

(51) Int. Cl.[7] ............................................. H04L 23/00
(52) U.S. Cl. ................... 375/377; 307/29; 307/36; 307/98; 307/128; 307/154; 327/61; 327/337
(58) Field of Search .............................. 307/29, 30, 36, 307/37, 51, 54, 63, 98, 128, 154; 327/61, 327/111, 337, 375; 375/257, 377

(56) References Cited

U.S. PATENT DOCUMENTS

| | | | | |
|---|---|---|---|---|
| 3,628,055 A | * | 12/1971 | Lum | 327/126 |
| 3,671,774 A | * | 6/1972 | Millman | 327/227 |
| 4,453,091 A | * | 6/1984 | Katakura et al. | 327/97 |
| 5,006,734 A | * | 4/1991 | Engelbrecht | 327/322 |
| 5,124,578 A | * | 6/1992 | Worley et al. | 326/34 |
| 5,640,127 A | * | 6/1997 | Metz | 330/298 |
| 5,994,929 A | * | 11/1999 | Sano et al. | 327/111 |
| 6,140,858 A | * | 10/2000 | Dumont | 327/317 |
| 6,396,327 B1 | * | 5/2002 | Lam | 327/317 |
| 6,639,772 B2 | * | 10/2003 | Chuang et al. | 361/56 |

* cited by examiner

Primary Examiner—Dac V. Ha

(57) ABSTRACT

A transmit and receive protection circuit for use in a communication system is disclosed. The protection circuit uses a four-diode gate in which the currents through an input portion and an output portion of the diode gate are individually controlled by resistors located in their respective portions. This arrangement allows the DC currents through each portion to be independently controlled. By using resistors to independently control the DC currents through each portion of the diode gate, better control over the individual DC currents can be achieved, leading to effective AC resistances which are more predictable. This arrangement results in a predictable low loss protection circuit at a minimal expense.

13 Claims, 3 Drawing Sheets

TRANSMIT AND RECEIVE PROTECTION CIRCUIT

FIELD OF THE INVENTION

The present invention relates to electronic protection circuits. More particularly, the present invention relates to electronic protection circuits for use in a transceiver between the transmitter and receiver.

BACKGROUND OF THE INVENTION

Conventional transmit and receive circuits, such as those found in radio transceivers, contain a protection circuit for isolating a receiver from a transmitter while allowing the receiver to receive signals from an antenna. The protection circuit allows low power AC input signals received at the antenna to pass from the antenna to the receiver, while protecting the receiver from potentially damaging high power AC currents within the transceiver. The high power AC currents may be generated by the transmitter or other components located within the transceiver. The protection circuit is typically coupled between the receiver side and the antenna/transmitter side through AC coupling capacitors to prevent DC currents from flowing between the protection circuit and other transceiver components while allowing AC signals to pass.

FIG. 1A depicts a prior art transmit and receive protection circuit 10 used in a transceiver. The protection circuit 10 allows low power AC input signals to pass from an antenna 11 over an input line 22 to a receiver 13 over an output line 24 while isolating the receiver 13 from potentially damaging high power AC signals generated by a transmitter 15 typically located within the transceiver. The circuit in FIG. 1 contains a four-diode gate 12, AC coupling capacitors C1 and C2, and resistors R1 and R2.

In protection circuit 10, the input line 22 from an antenna 11 and transmitter 15 is coupled to an input side 26 of the four-diode gate 12 through the AC coupling capacitor C1, and the receiver output line 24 is coupled to an output side 28 of the four-diode gate 12 through the AC coupling capacitor C2. The AC coupling capacitors C1 and C2 prevent DC current from flowing between the protection circuit 10 and other transceiver components over the input line 22 and the output line 24, while allowing AC signals to pass from the input line 22 to the four-diode gate 12 and from the four-diode gate 12 to the output line 24.

The four-diode gate 12, comprising diodes 14, 16, 18, and 20, operates to allow small AC signals to pass from node $v_A$ to node $v_B$ while clipping large AC signals in order to protect the receiver 13. For descriptive purposes it will be assumed the diodes 14, 16, 18, and 20 are identical diodes. When sufficient current flows through resistors $R_1$ and $R_2$, all diodes 14, 16, 18, and 20 are on and a small AC signal present at node $v_{IN}$ is passed to node $v_{OUT}$ because the voltage level at node $v_B$ will substantially follow the voltage level at node $v_A$. When the current flowing through resistors $R_1$ and $R_2$ is substantially zero, all diodes are off and there is little coupling between node $v_{IN}$ and node $v_{OUT}$.

The four-diode gate 12 clips large AC signals by switching diodes 14, 16, 18, and 20 depending on the AC voltage level at node $v_{IN}$ and the current flowing in the respective diodes. When the AC voltage at node $v_{IN}$ exceeds a threshold voltage which is approximately 0.6V (the voltage potential required for diode 14 to be forward biased) less than the voltage on node 30, which is the voltage level V+ minus the voltage drop across resistor $R_1$, diode 14 will be reversed biased, i.e., turned off. Similarly, when diode 14 turns off, diode 20 will also turn off. Alternatively, when the AC voltage level at node $v_{IN}$ drops below a threshold voltage which is within approximately 0.6V (the voltage potential required for diode 16 to be forward biased) of the voltage on node 31, which is the voltage level V− plus the voltage drop across resistor $R_2$, diode 16 will be reverse biased, i.e. turned off. Similarly, when diode 16 is off, diode 18 will also turn off. The diodes will turn off and on as the AC voltage at node $v_{IN}$ crosses the threshold voltages, with diodes 14 and 20 turning off for high positive voltages and diodes 16 and 18 turning off for high negative voltage causing the voltage level passed from node $v_A$ to node $v_B$ to be clipped, thus preventing potentially damaging AC voltages from reaching the receiver 13.

The DC current through the diodes 14, 16, 18, and 20 are regulated by the values chosen for the circuit supply voltages V+ and V− and the resistor values chosen for $R_1$ and $R_2$. As the DC current through the diodes goes up, the AC resistance of the diodes goes down. Therefore, the higher the DC current through all of the diodes the lower the loss of a signal passing from input line 22 to output line 24.

FIG. 1B illustrates a restriction imposed on protection circuit 10 of FIG. 1A. Currents $i_{C1}$ and $i_{C2}$ are DC control currents and currents $i_{S1}$ and $i_{S2}$ are AC signal currents. If all the diodes are identical, the DC control current $i_C$ is determined by dividing the potential difference between V+ and V−, less the forward bias voltage drop of diodes $D_{1\ and\ D2}$ in parallel with diodes $D_3$ and $D_4$, by the resistance of resistors $R_1$ and $R_2$. For purposes here, the AC resistance of the diodes are non-linear and approximately inversely proportional to the DC current therein. Up to this point, it was assumed that the DC control currents $i_{C1}$ and $i_{C2}$ were each one-half of DC control current $i_C$ and the AC signal currents $i_{S1}$ and $i_{S2}$ were each one-half of the total signal current is because it was assumed that all of the diodes were identical. However, discrete diodes are notoriously poorly matched, and diodes formed in a common substrate may not be well matched either. Individual diodes in parallel arrangements can conduct widely disparate amounts of current and their effective AC resistance are very sensitive to DC current flow and, therefore, the AC resistance of the individual diodes can vary greatly. This results in control currents which are unpredictable and vary on the input side 26 and the output side 28, leading to losses in the protection circuit 10. Unless rigorous matching techniques are applied, the protective circuit may have unacceptable loss. The matching techniques may be expensive and time consuming, leading to high costs.

SUMMARY OF THE INVENTION

The present invention discloses a superior transmit and receive protection circuit for use in a communication system. In the superior transmit and receive protection circuit, the DC currents through an input side and an output side of a four-diode gate are controlled independently. By independently controlling the DC currents through each side of the four-diode gate, more control over the DC currents through the individual diodes of a four-diode gate is achieved. This allows a four-diode gate having low AC resistance to be created in which low power AC signals on an input side of the four-diode gate are accurately reproduced on an output side of the four-diode gate. The invention can be implemented with common resistors, diodes, and capacitors. This arrangement results in an inexpensive, predictable, low loss transmit and receive protection circuit.

DETAILED DESCRIPTION OF THE INVENTION

The present invention discloses a superior transmit and receive protection circuit for use in a communication system. The invention allows the DC current through individual diodes of a four-diode gate to be selectively controlled. By controlling the currents through the individual diodes, the protection circuit can offer improved predictability and loss characteristics without the need for elaborate diode matching. The present invention can be implemented with minimal cost using readily available components.

Figure 1A:
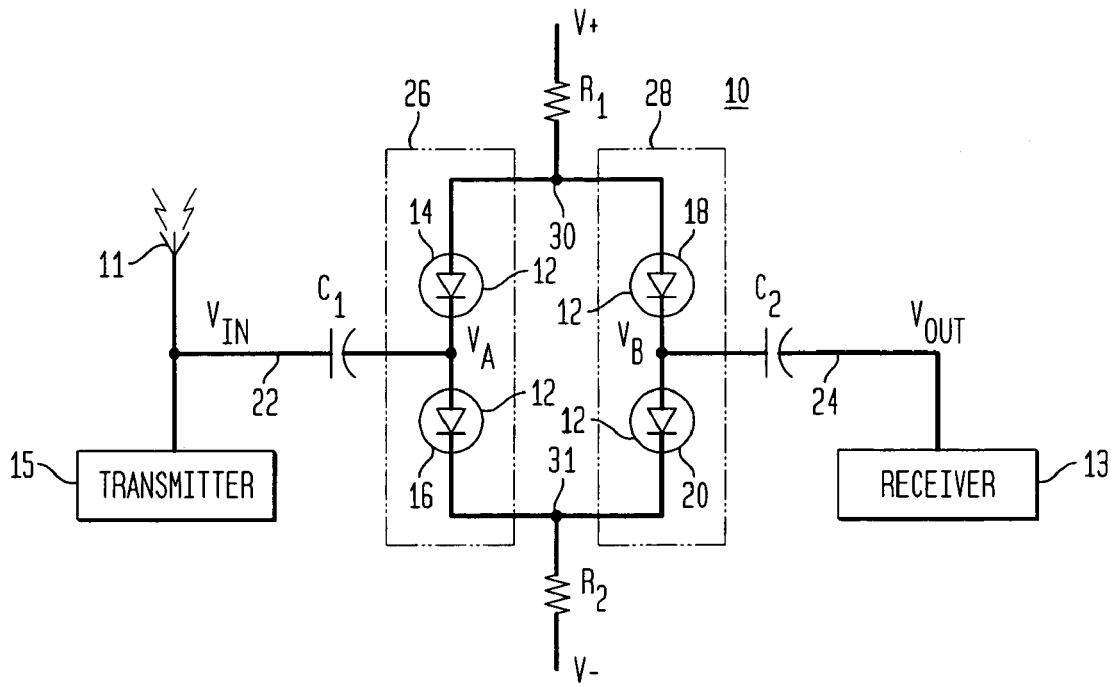
FIG. 1A is a circuit diagram of a prior art transmit and receive protection circuit.
Figure 1B:
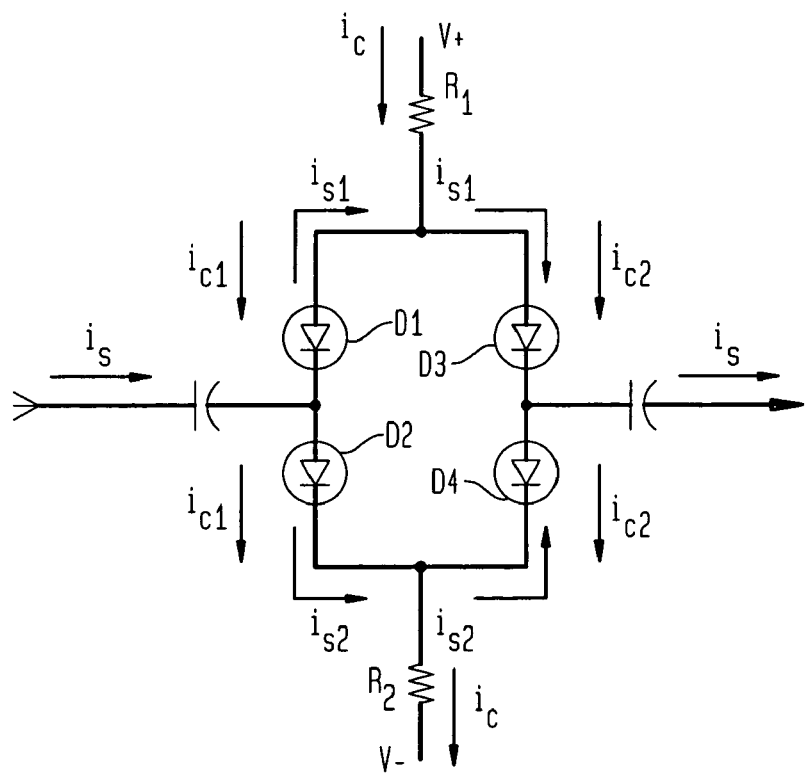
FIG. 1B is a circuit diagram depicting the four-diode gate of FIG. 1A.
Figure 2A:
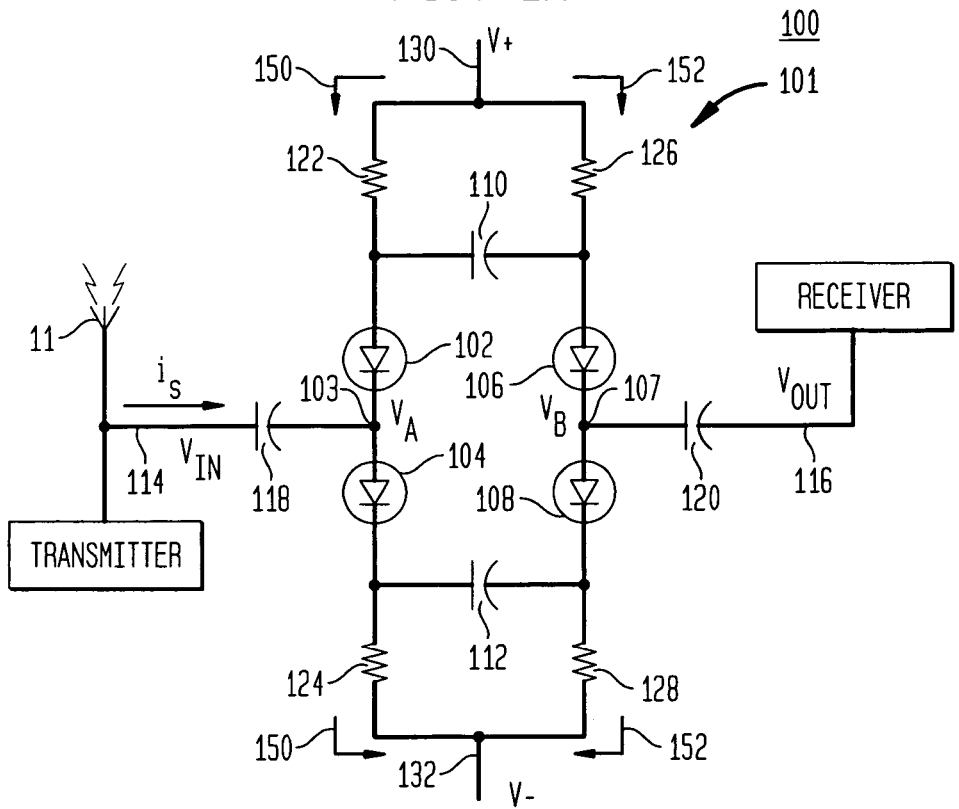
FIG. 2A is a circuit diagram of a preferred embodiment of a transmit and receive protection circuit in a communication system in accordance with the present invention.

FIG. 2A depicts a preferred embodiment of the present invention in an exemplary communication system 100. In the preferred embodiment of the present invention, the protection circuit 101 comprises an input side 150 comprising resistor 122, diode 102, diode 104, and resistor 124 connected in series between a first potential 130 and a second potential 132; and an output side 152 comprising resistor 126, diode 106, diode 108, and resistor 128 connected in series between the first potential 130 and the second potential 132. Diode 102 and diode 104 form an input terminal 103 at their connection; and diode 106 and diode 108 form an output terminal 107 at their connection. Protection circuit 101 may also comprise AC coupling capacitors 110, 112, 118, and 120. In the preferred embodiment first potential 130 is a positive voltage and second potential 132 is a negative voltage, however, other voltage combinations could be used as long as the first potential 130 is more positive than the second potential 132. Diodes 102, 104, 106, and 108 are preferably conventional PN junction diodes due to the low cost of such diodes but other kinds of diodes, such as PIN or Schottky diodes, may be used.

The DC control current through the input side 150 is determined primarily by the values chosen for resistors 122 and 124, voltages V+ and V−, and secondarily by the characteristics of diodes 102 and 104. Likewise, the current through the output side 152 is determined primarily by the values chosen for resistors 126 and 128, voltages V+ and V−, and secondarily by the characteristics of diodes 106 and 108. Since the currents are primarily determined by the resistance of the resistors, which exhibit more accurate and stable resistance characteristics than diodes, the DC control currents through the four-diode gate can be well controlled. By individually regulating the DC control currents through each side 150 and 152, different DC control currents in each side can be avoided, thus the losses to an AC signal passing through the diodes due to high effective AC resistance of the lower current carrying diodes can be reduced. A further advantage is that since the DC control current is well controlled, the allowable signal current $i_s$ becomes predictable. Preferably, the DC control current through each side 150 and 152 are substantially equal.

Capacitors 110 and 112 are AC coupling capacitors for coupling the AC components on the input side 150 to the output side 152. Capacitors 118 and 120 are AC coupling capacitors used to couple an input signal on input line 114 to the input side 150 of protective circuit 101 and to couple the output side 152 of protective circuit 101 to an output line 116, respectively. Although used in the preferred embodiment, AC coupling capacitors 118 and 120 are not required in the present invention to achieve improvements over the prior art if no significant DC current would flow through input line 114 or output line 116.

Figure 2B:
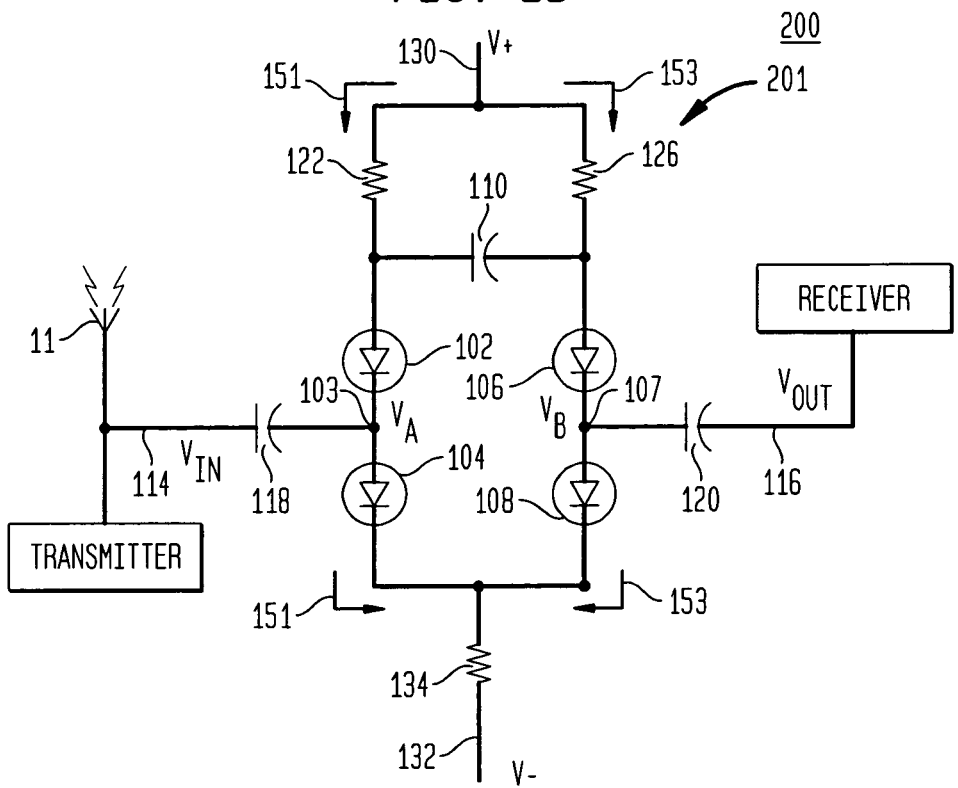
FIG. 2B is a circuit diagram of an alternative embodiment of a transmit and receive protection circuit in a communication system in accordance with the present invention which exhibits reduced current requirement.

FIG. 2B depicts an alternative embodiment of the present invention in an exemplary communication system 200. In the alternative embodiment of the present invention, protection circuit 201 is similar to the configuration used in the preferred embodiment protection circuit 101 with the exception that resistor 124 and 128 in FIG. 2A are combined into a single resistor 134 in protection circuit 201, and capacitor 112 in FIG. 2A is eliminated. This arrangement combines the currents through the protection circuit 201 into a single resistor path into second potential 132. By combining the currents into a single resistive path, current and component savings can be realized in the protection circuit 201 at the expense of some loss in independent control over the currents flowing through paths 151 and 153. This embodiment exhibits similar improvements in losses and predictability over the prior art as the preferred embodiment.

Figure 2C:
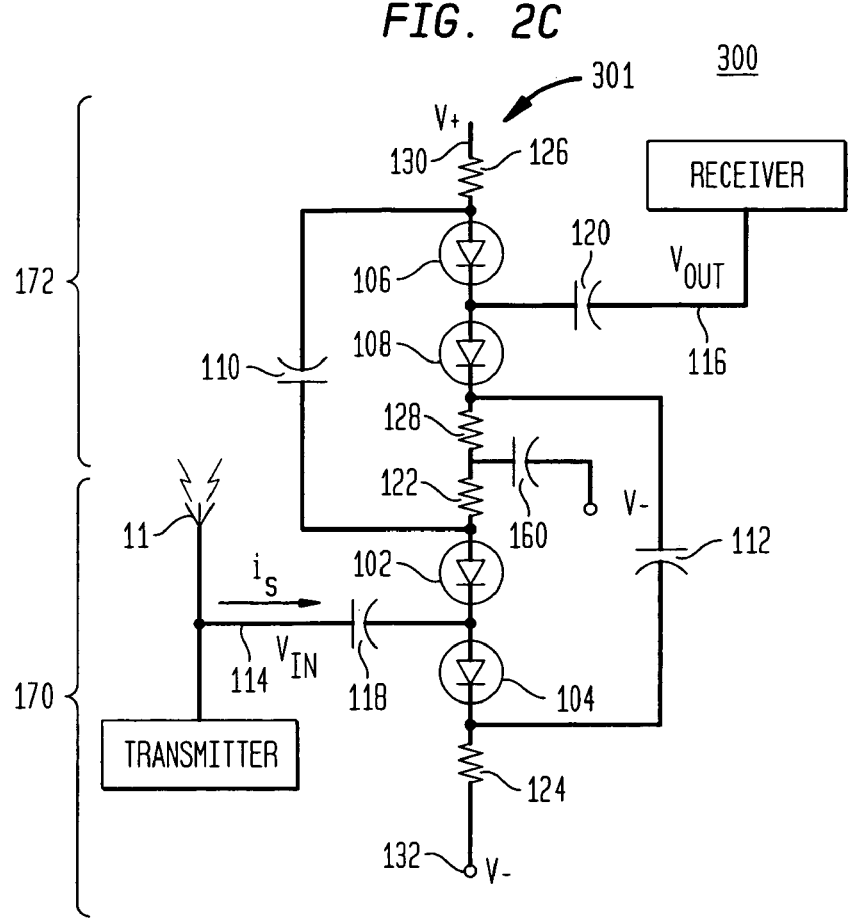
FIG. 2C is a circuit diagram of an alternative embodiment of a transmit and receive protection circuit in a communication system in accordance with the present invention which utilizes a current reuse scheme.

FIG. 2C depicts another alternative embodiment of the present invention in an exemplary communication system 300. In the alternative embodiment of the present invention, protection circuit 301 uses a single current path for the input portion 170 and the output potion 172 of the protection circuit 301. Input portion 170 is equivalent to input side 150 and output portion 172 is equivalent to input side 152, of the preferred embodiment in FIG. 2A. The protection circuit 301 comprises identical components as the protection circuit 101 with the addition of a bypass capacitor 160 positioned between the input portion 170 and the output portion 172 of the protection circuit 301. This arrangement allows the current used to forward bias the diodes to be used by both the input portion 170 and the output portion 172 of the protection circuit 301, thereby reusing the DC control current to achieve a more efficient protection circuit 301 in terms of current requirements. The arrangement results in the same amount of DC control current flowing through each diode. In addition to current savings, this embodiment also exhibits similar improvements in losses and predictability over the prior art as the preferred embodiment.

Figure 2D:
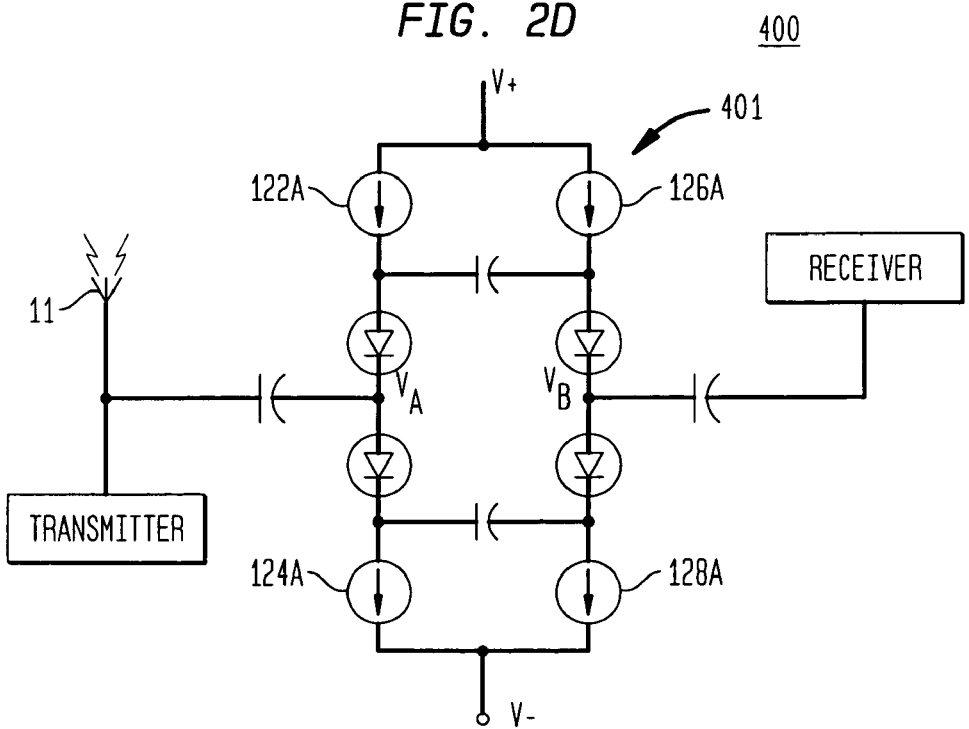
FIG. 2D is a circuit diagram of an alternative embodiment of a transmit and receive protection circuit in a communication system in accordance with the present invention which utilizes current sources.

FIG. 2D depicts another alternative embodiment of the present invention in an exemplary communication system 400. In this alternative embodiment of the present invention, protection circuit 401 is similar to the configuration used in the preferred embodiment protection circuit 101 with the exception that resistors 122, 124, 126, and 128 are replaced with current sources 122A, 124A, 126A, and 128A, respectively. This arrangement allows the currents through the individual diodes to be selectively controlled by adjusting the individual current sources 122A, 124A, 126A, and 128A. This embodiment of the present invention may be implemented by replacing one or more of the resistors in the embodiments depicted in FIGS. 2A–C with one or more corresponding current sources. For example, resistor 122 in FIGS. 2A–C could be replaced with a current source while the other resistors in FIGS. 2A–C could remain. The currents from the current sources are preferably substantially equal and substantially constant. Other variations will be readily apparent to one skilled in the art.

Having thus described a few particular embodiments of the invention, various alterations, modifications, and improvements will readily occur to those skilled in the art. For example, current sources may replace some or all of the resistors as appropriate. In addition, the invention can be implemented using discrete components or integrated circuit technology. Other kinds of diodes may be used, including diode-connected bipolar and field effect transistors. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. In a communication system, a protection circuit comprising:
    first and second diodes and first and second resistors connected in series between first and second power supply terminals; and
    third and fourth diodes and third and fourth resistors connected in series between the first and second power supply terminals;
    wherein the first and second diodes form an input terminal at their connection and the third and fourth diodes form an output terminal at their connection.

2. The protection circuit of claim 1, further comprising:
    a first capacitor having an input coupled between said first resistor and said first diode, and an output coupled between said third resistor and said third diode; and
    a second capacitor having an input coupled between said second diode and said second resistor, and an output coupled between said fourth diode and said fourth resistor.

3. The protection circuit of claim 2, further comprising:
    a third capacitor having an input for coupling to an antenna/transmitter, and an output coupled to said input terminal; and
    a fourth capacitor having an output for coupling to a receiver, and an input coupled to said output terminal.

4. The protection circuit of claim 1, wherein the first and third resistors connect to the first power supply terminal, and the second and fourth resistors connect to the second power supply terminal.

5. The protection circuit of claim 1, wherein the first and third resistors have substantially the same value, and the second and fourth resistors have substantially the same value.

6. The circuit of claim 1, wherein at least one of the resistors is a current source.

7. A communication system comprising:
    a first resistor and a second resistor for coupling to a first power supply terminal;
    a third resistor for coupling to a second power supply terminal;
    a first diode and a second diode connected in series between said first resistor and said third resistor wherein said first diode and said second diode form an input terminal at their connection;
    a third diode and a fourth diode connected in series between said second resistor and said third resistor, wherein said third diode and said fourth diode form an output terminal at their connection; and
    a first coupling capacitor having a first end coupled between said first resistor and said first diode, and a second end coupled between said second resistor and said third diode.

8. The system of claim 7, wherein said third resistor comprises a fourth resistor and a fifth resistor, said fourth resistor coupled in series between said second diode and said second power supply terminal, and said fifth resistor coupled in series between said fourth diode and said second power supply terminal; and the system further comprising a second coupling capacitor having a first end coupled between said fourth resistor and said second diode, and a second end coupled between said fifth resistor and said fourth diode.

9. The system of claim 7, wherein at least one of the resistors is a current source.

10. A communication system comprising
    a first resistor coupled to a first power supply terminal;
    a first diode and a second diode coupled in series with said first resistor, wherein said first diode and said second diode form an output terminal at their connection;
    a second resistor and a third resistor coupled in series with said first diode and said second diode;
    a third diode and a fourth diode coupled in series with said third resistor and said fourth resistor, wherein said third diode and said fourth diode form an input terminal at their connection;
    a fourth resistor coupled in series between said fourth diode and a second power supply terminal;
    a first coupling capacitor having a first end coupled between said first resistor and said first diode, and a second end coupled between said third resistor and said third diode;
    a second coupling capacitor having a first end coupled between said second resistor and said second diode, and a second end coupled between said fourth resistor and said fourth diode;
    a bypass capacitor having a first end coupled between said second resistor and said third resistor and a second end coupled to said second power supply terminal.

11. The system of claim 10, further comprising an input capacitor having an input for coupling to an analog signal and an output coupled to said input terminal, said input capacitor for passing AC signals while preventing the flow of DC currents.

12. The system of claim 11, further comprising an output capacitor having an output and an input coupled to said output terminal.

13. In a communications system, a protection circuit including first, second, and third resistors, said protection circuit further comprising:
    first and second diodes connected in series with said first and third resistors between first and second power supply terminals; and
    third and fourth diodes connected in series with said second and third resistors between the first and second power supply terminals;
    wherein the first and second diodes form an input terminal at their connection and the third and fourth diodes form an output terminal at their connection.

* * * * *